(12) United States Patent
Duan

(10) Patent No.: US 8,457,447 B2
(45) Date of Patent: Jun. 4, 2013

(54) SYSTEM FOR DOCUMENT DIGITIZATION

(75) Inventor: Qingfeng Duan, Herndon, VA (US)

(73) Assignee: Ecompex, Inc., Reston, VA (US)

( * ) Notice: Subject to any disclaimer, the term of this patent is extended or adjusted under 35 U.S.C. 154(b) by 211 days.

(21) Appl. No.: 13/076,894

(22) Filed: Mar. 31, 2011

(65) Prior Publication Data

US 2011/0243478 A1 Oct. 6, 2011

Related U.S. Application Data

(62) Division of application No. 11/682,629, filed on Mar. 6, 2007, now Pat. No. 7,936,951.

(51) Int. Cl.
*G06K 9/54* (2006.01)

(52) U.S. Cl.
USPC .......................................................... 382/305

(58) Field of Classification Search
USPC ....... 345/595; 382/305; 700/49, 104; 706/45, 706/50, 60, 61; 707/E17.117, 709, 710; 714/26, 714/E11.157; 715/200, 212
See application file for complete search history.

(56) References Cited

U.S. PATENT DOCUMENTS

| | | | |
|---|---|---|---|
| 5,388,189 A | 2/1995 | Kung | |
| 5,717,914 A * | 2/1998 | Husick et al. | 1/1 |
| 5,982,956 A * | 11/1999 | Lahmi | 382/306 |
| 6,587,847 B1 * | 7/2003 | Stier et al. | 706/50 |
| 6,684,202 B1 | 1/2004 | Humphrey et al. | |
| 6,775,422 B1 * | 8/2004 | Altman | 382/305 |
| 7,069,536 B2 * | 6/2006 | Yaung | 717/102 |
| 7,643,095 B2 * | 1/2010 | Yoshii | 348/687 |
| 7,689,544 B2 * | 3/2010 | Koenig | 707/741 |
| 2002/0138571 A1 * | 9/2002 | Trinon et al. | 709/204 |
| 2003/0163302 A1 * | 8/2003 | Yin | 704/9 |
| 2005/0249388 A1 * | 11/2005 | Linares | 382/124 |
| 2006/0245654 A1 | 11/2006 | Viola et al. | |
| 2006/0285746 A1 | 12/2006 | Yacoub et al. | |
| 2006/0288279 A1 | 12/2006 | Yacoub et al. | |
| 2007/0233287 A1 | 10/2007 | Sheshagiri et al. | |
| 2008/0077632 A1 * | 3/2008 | Tysowski et al. | 707/204 |

OTHER PUBLICATIONS

IBM Technical Disclosure Bulletin, "Fast Table Joining in Relational Data Bases and Fast Row Retrieval", Jul. 1987, NN8707750.*

* cited by examiner

*Primary Examiner* — Gregory F Cunningham
(74) *Attorney, Agent, or Firm* — Roberts Mlotkowski Safran & Cole, P.C.

(57) ABSTRACT

A system for digitizing a set of documents, the documents belonging to a domain. The system includes an input module for providing documents in electronic form, a digitization module for digitizing the documents provided by the input module, an image repository and digitization database system, the image repository and digitization database system including an image repository, at least one digitization database and at least one knowledge base, a knowledge crawler/builder module for receiving data from the digitization database and building the knowledge base, and a delivery module for providing digitized data. A process for digitizing a set of documents is also provided.

13 Claims, 5 Drawing Sheets

DATE 01/16/83

TRANSACTION REGISTER

| | | | | | |
|---|---|---|---|---|---|
| DD5-HDD2155 | HB | T. BROWN | 66310910010 | 03/23/89 | 6631T49830899 6JKIGT D1 | 623.56 CD22 |
| DD5-HDD2155 | HB | SMITHERSON | 66310910010 | 03/23/89 | 6631T49830899 6JKIGT D1 | 702.89 CD22 |

FIG. 1

SYSTEM FOR DOCUMENT DIGITIZATION

This Application is a Divisional of co-pending U.S. patent application Ser. No. 11/682,629 filed on Mar. 6, 2007. The entire content of this application is hereby incorporated by reference.

FIELD OF THE INVENTION

The present invention relates generally to document digitization and recognizing the content of electronic documents.

BACKGROUND OF THE INVENTION

Government agencies, corporations, publishers and other institutions often require large collections of paper-based documents to be converted into digital forms suitable for digital libraries, electronic archival purposes, further processing or the like. In some cases, the number of documents to be converted is extremely large, exceeding hundreds of thousands of individual pages.

Computers are employed to convert these large collections of paper-based documents into computer-readable formats. Typically, paper-based documents are initially scanned to produce digital high-resolution images for each page. The images are often further processed to enhance quality, remove unwanted artifacts, and analyze the digital images.

Document digitization is a process of capturing data records from digital images, physical paper, or other medium. Traditionally, one can use either a human data entry method or an automated method assisted with an optical character recognition (OCR) technology, intelligent character recognition (ICR) technology or natural handwriting recognition (NHR) technology, or a combination of them. These methods have fulfilled the demands for document digitization in cases where the fields to be captured are few or the quality of the content is sufficiently good for an aggressive OCR/ICR, or NHR system.

As recognized by those skilled in the art, OCR involves converting a digital image of textual information into a form that can be processed as textual information. Since electronically captured documents are often simply optically scanned digital images of paper documents, page decomposition and OCR are often used together to gather information about the digital image and sometimes to create an electronic document that is easy to edit and manipulate using commonly available word processing and document publishing software. In addition, the textual information collected from the image through OCR is often used to allow documents to be searched based on their textual content.

The digital images, however, often include errors and thus may not be acceptable for their intended purposes. Even today's fully automated document analysis and extraction systems are not able to generate documents that are essentially errorless, especially when large collections of paper-based documents are being converted into digital form. By way of example, some documents contain a mixture of text and images, such as newspapers and magazines that include advertisements or pictures. Automated document analysis and extraction systems can generate errors while analyzing and extracting different portions of such documents.

U.S. Patent Application Publication No. 2006/0285746 proposes a method, apparatus, and system for computer assisted document analysis. One embodiment is a method for software execution. The method is said to include selecting, in response to user input, criteria in a character recognition engine to identify suspect errors in scanned documents, executing the engine on a subset of the scanned documents to determine an accuracy of error detection using the criteria; and adjusting, in response to user input, the criteria to adjust the accuracy of identifying suspect errors.

From the foregoing it will be apparent that there is still a need for an improved system and process for document digitization and recognizing the content of electronic documents.

SUMMARY OF THE INVENTION

In one aspect, provided is a system for digitizing a set of documents, the documents belonging to a domain. The system includes an input module for providing documents in electronic form, a digitization module for digitizing the documents provided by the input module, an image repository and digitization database system, the image repository and digitization database system including an image repository, at least one digitization database and at least one knowledge base, a knowledge crawler/builder module for receiving data from the digitization database and building the knowledge base, and a delivery module for providing digitized data.

In another aspect, provided is a process for digitizing a set of documents. The process includes the steps of loading a set of definitions, the set of definitions including image type and fields, initializing a knowledge base from a knowledge base library, the knowledge base library having a plurality of knowledge bases categorized by domain, the initialized knowledge base corresponding to the domain of the set of documents and containing information relevant to the domain, providing a document in electronic form for digitizing from a set of documents, the document having a plurality of records, loading the initialized knowledge base from the knowledge base library, digitizing each record of the document; automatically generating at least one field value using information from the knowledge base, and validating each record of the document.

In yet another aspect, the digitization module includes three sequential processes, a single digitization process, a double digitization process, and a review process. The single digitization process captures required records, the double digitization process digitizes against results of the single digitization process and the review process provides a final review and verifies that all digitized data are valid.

In a further aspect, the delivery module may be designed to deliver digitized data in custom formats, such as text file, XML document and other database files.

In a still further aspect, a user interface is provided that is capable of promoting eye comfort for system users.

The system disclosed herein may possess the capability of allowing multiple users to use the system and provides a locking mechanism for locking a document to a first user so that other users cannot access the document unless it has been unlocked by the first user.

The system disclosed herein is capable of achieving up to about 99.99% data accuracy.

These and other features are described herein with specificity so as to make the present invention understandable to one of ordinary skill in the art.

BRIEF DESCRIPTION OF THE DRAWINGS

The invention is further explained in the description that follows with reference to the drawings illustrating, by way of non-limiting examples, various embodiments of the invention wherein:

FIG. 1 presents a document possessing poor quality characteristics and a large set of records to be captured;

DETAILED DESCRIPTION OF THE INVENTION

Figure 2:
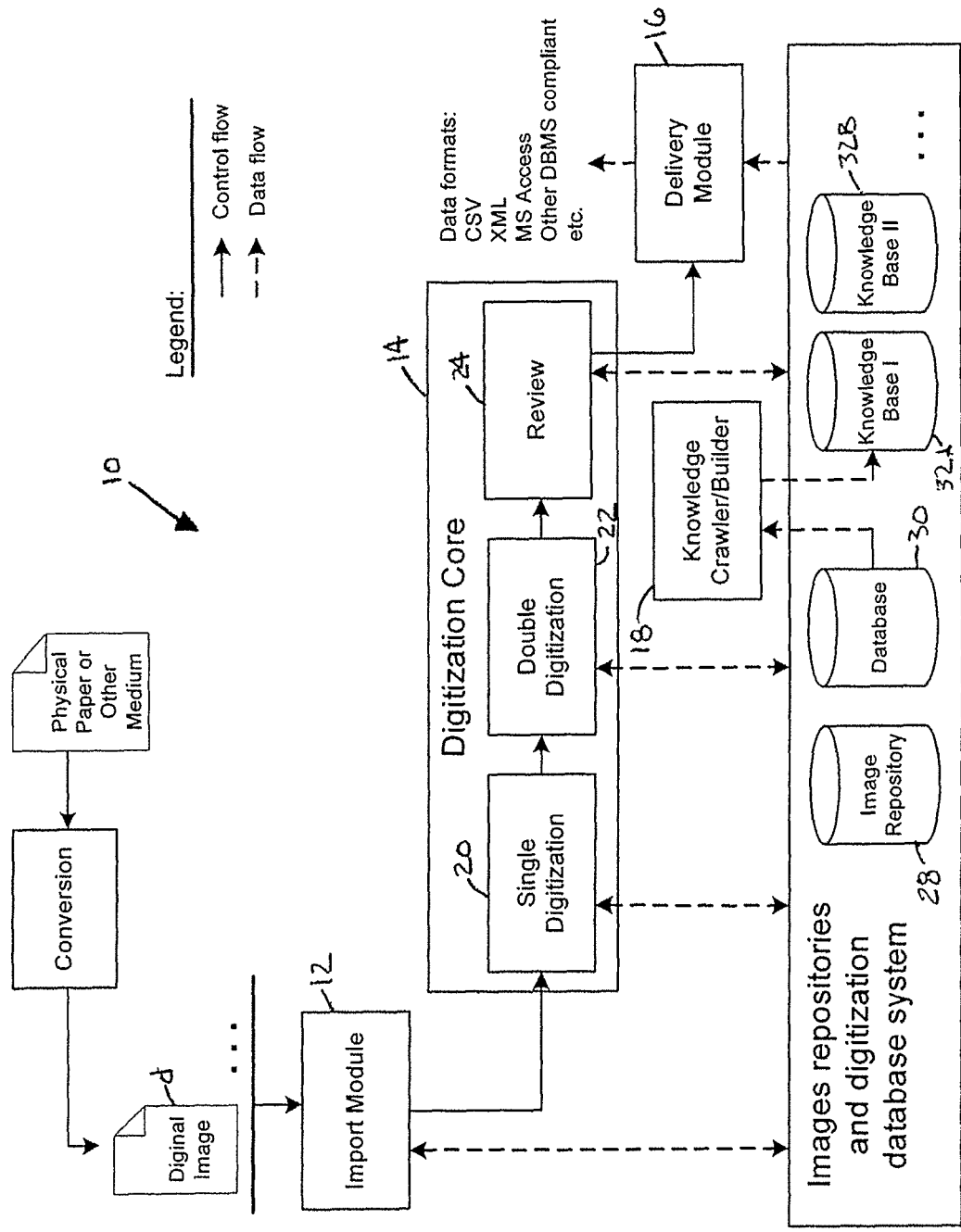
FIG. 2 presents a system architecture for the system and process disclosed herein.

Disclosed herein is a system and process for digitizing documents, each now described in specific terms sufficient to teach one of skill in the practice thereof. In the description that follows, numerous specific details are set forth by way of example for the purposes of explanation and in furtherance of teaching one of skill in the art to practice the invention. It will, however, be understood that the invention is not limited to the specific embodiments disclosed and discussed herein and that the invention can be practiced without such specific details and/or substitutes therefor. The present invention is limited only by the appended claims and may include various other embodiments which are not particularly described herein but which remain within the scope and spirit of the present invention.

Document digitization is a process of capturing data records from digital images, physical paper, or other medium. Traditionally, human data entry methods and automated methods assisted by optical character recognition technology (OCR), intelligent character recognition technology (ICR) and/or natural handwriting recognition technology (NHR) have been employed. However, these methods are ineffective in cases where extensive time and labor resources are required. Such cases include: 1) when there are a large number of fields to be digitized on a document; and/or 2) when the quality of the content, especially digital images, is so poor that an aggressive OCR/ICR or NHR technology is of little to no assistance. When one considers that there are millions of such documents that need to be digitized, it is clear that an innovative technology would be of value.

The system and process disclosed herein takes advantage of the salient features of a field and the relationships among fields and can intelligently render the majority of fields without manual entering and leverages a unique knowledge-based approach for lookups. As will become apparent to one skilled in the art, the system and process disclosed herein utilize a very user-friendly interface to separate the image displaying area from the digitization working area, while synchronizing the display of the image with operator movement. Moreover, the system and process disclosed herein consists of a set of powerful modules, including an import module, a digitization (single, double, and review) module, and a delivery module, to achieve up to 99.99% accuracy in an automated process.

As is well known to those skilled in the art, when the number data fields to be captured from a document is extremely large (e.g., over 800 fields), or the quality of the content, especially digital images, is poor and possesses table lines, specks, and/or dot matrix fonts, the aforementioned traditional methods are ineffective.

FIG. 1 presents an example of such a document in the form of a typical transaction register document. As may be seen, for this document, 16 fields require digitization. These are identified as, Transaction No., Transaction Date, Account Number, Account Type, First Name, Middle Name, Last Name, SSN, Birth Date, Transaction Description, Check No., Debit, Credit, Balance, Subtotal and Total) for every record. This may be seen to total about 800 fields for the 50 records appearing on the document. In addition, there are many table lines interfering with the content of the document. There are also specks and, even worse, the content was printed using old-style dot matrix fonts. Even trying to enhance the quality using such state-of-the-art technologies as registering, removing the lines, and smoothing the text does not help, since even the best OCR/ICR engine available today still does not recognize the content with acceptable accuracy. In fact, in trials, the accuracy obtained was only less than 5% when using conventional methods.

It is not uncommon to find large numbers of such images scanned from documents created in the 1980's and earlier. As may be appreciated, such images are quite common in the banking or other finance sectors.

In one form, provided is a system for digitizing a set of documents, the documents belonging to a domain. The system includes an input module for providing documents in electronic form, a digitization module for digitizing the documents provided by the input module, an image repository and digitization database system, the image repository and digitization database system including an image repository, at least one digitization database and at least one knowledge base, a knowledge crawler/builder module for receiving data from the digitization database and building the knowledge base, and a delivery module for providing digitized data.

In another form, provided is a process for digitizing a set of documents. The process includes the steps of loading a set of definitions, the set of definitions including image type and fields, initializing a knowledge base from a knowledge base library, the knowledge base library having a plurality of knowledge bases categorized by domain, the initialized knowledge base corresponding to the domain of the set of documents and containing information relevant to the domain, providing a document in electronic form for digitizing from a set of documents the document having a plurality of records, loading the initialized knowledge base from the knowledge base library, digitizing each record of the document; automatically generating at least one field value using information from the knowledge base, and validating each record of the document.

System Architecture

As shown in FIG. 2, one form of the system 10 disclosed herein includes the following modules: an import module 12, a digitization module 14, a delivery module 16, and a knowledge crawler/builder module 18. The import module 12 functions to import digital images d into the system 10. The digitization module 14 is the core module to digitize the imported images d. Digitization module 14 includes three sequential processes: a single digitization process 20, a double digitization process 22, and a review process 24. The single digitization process 20 fully captures all of the required records. The double digitization process 22 digitizes against the results from the single digitization process 20, while the review process 24 provides a final review and verifies that all digitized data is valid. The combination of these three processes possesses the ability to achieve 99.99% data accuracy.

The delivery module 16 is designed to deliver digitized data in custom formats, such as text file, XML document and other database files. The knowledge crawler/builder module 18 collects and processes the digitized data from the digitization databases 30 (crawler) and partitions the data into separate knowledge bases 32A, 32B, etc. (builder), which can then be used by the digitization module 14 to do lookups.

Import Module

The import module 12 is responsible for importing digital images d into the digitization system 14. A digital image d to be imported can be in any standardized format. It may also posses a unique identifier or have one assigned by the system 10, which can be used by system 10 to track and control whether or not it has been imported previously. If it has been imported previously, the system user is warned and provided with an option to either overwrite or ignore any previous result. As may be appreciated, this design assures the integrity of the imported data.

Digitization Module

Figure 3:
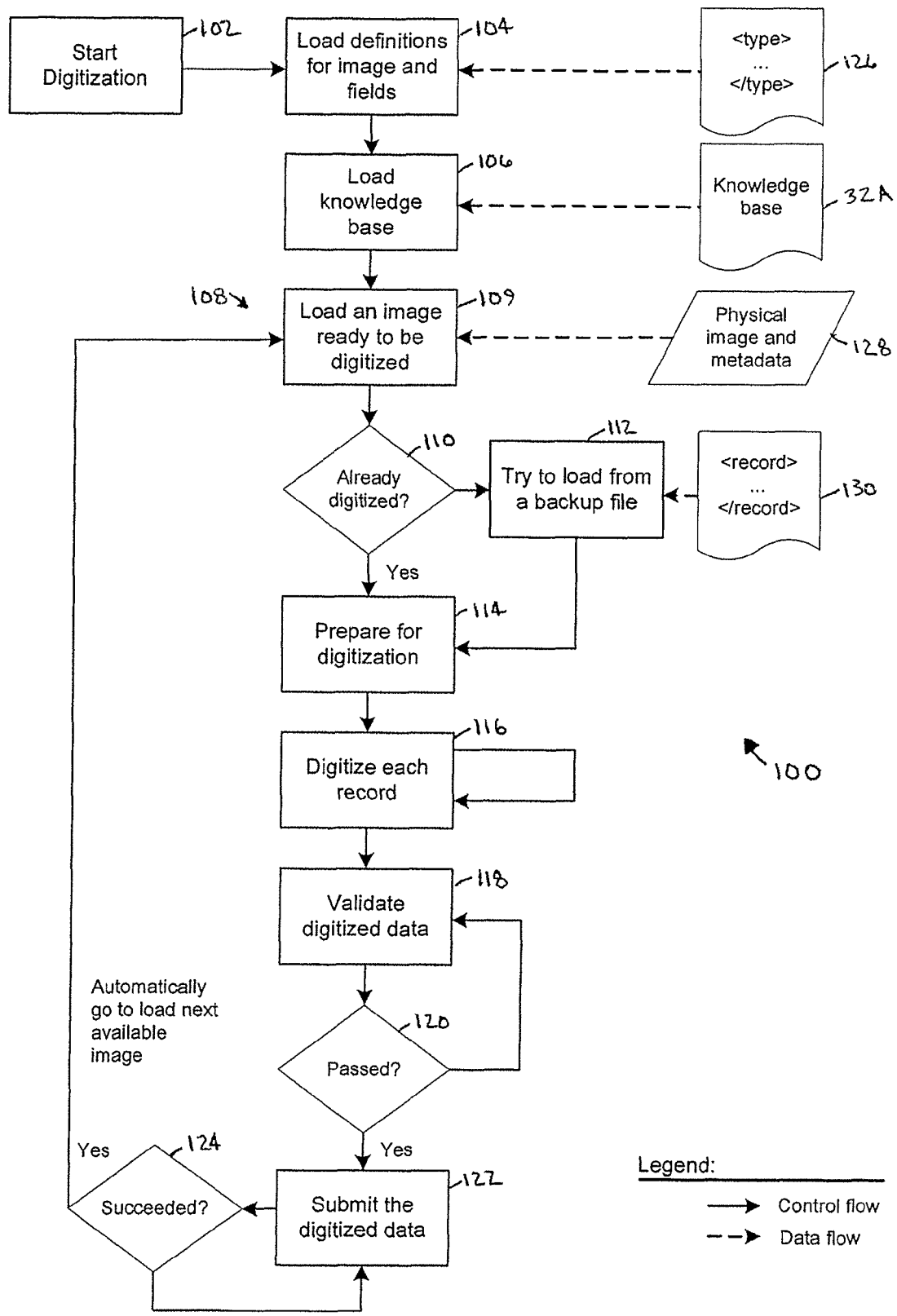
FIG. 3 presents a digitization process and workflow algorithm.

One form of a digitization process and workflow for use in digitization module 14 is presented in FIG. 3. It should be noted that, advantageously, once a digitization is initiated, the system 10 automatically renders the digitization task without human's intervention, no matter what stage it is in, single digitization 20, double digitization 22, or review 24. The significance of this design is that it leads to minimum management efforts while guaranteeing that an image goes through all three digitization cycles and thus a digitized data with 99.99% accuracy.

One form of a digitization algorithm 100 will now be described, with reference to FIG. 3. FIG. 3 presents the steps of an algorithm 100 that are required to complete a digitization process, including the steps of loading definitions of image type and fields to be digitized 104, initializing and loading a knowledge base 106, the steps required to digitize an image 108 through 116, validating the digitized data 118 and 120, and how to submit and save the digitized data 122 and 124. The digitization algorithm 100, as shown in FIG. 3, with further reference to FIG. 2, may be conducted as follows:

Step 102: Start digitization (Single 20, Double 22, or Review 24).

Step 104: Load definitions for image type and fields, which are predefined in an XML document, tableDescription.xml. Each definition, (Def), can have an image type and a list of fields, each of which have several attributes, such as Name, Data Type, Relative Locations, etc. Table 1, presented below, lists the definitions for image type and the fields to be digitized. If Step 104 fails, exit the algorithm 100.

Step 106: Load knowledge base. A knowledge base 32A, 32B, etc., is initialized based on a domain, such as Finance, which has been defined in an XML document, tableDescription.xml.

a. Initialize a knowledge base 32A, 32B, etc., to save the knowledge loaded, which could be in the form of a hashtable, for the consideration of constant time access, each of which, KBEntry, has a key, a list of value fields, and a counter, which tracks how many times the entry has been accessed (initialized as 0).

b. Initialize a list, MissList, to save the missed knowledge entries.

c. Initialize a counter, totalAcceses, to count total number of accesses to the knowledge base.

d. Initialize a counter, totalMisses, to count total number of misses when accessing to the knowledge base.

Step 108: Start a loop to digitize all available images.

Step 109: Load an image to digitize.

1. Load an image to digitize from a list of available images 128. For different digitization processes, load the images only ready for that specific process. The entire system also supports multi-users. In that sense, provided is an explicit locking mechanism; that is, once an image is locked to a user, other users will not be able to access it unless it has been unlocked.

1*a*. Check if there is an image locked for this user (Image.locked=true and Image.LockedBy=userID); if so, load it and Continue to Substep 2; otherwise go to Substep 1*b*.

1*b*. Select the first 20 images that are ready for any specific digitization process, single 20, double 22, or review 24, and save it into a temporary list, AvailableImages. The reason to select 20 images is twofold: it reduces the transaction time to prevent backend deadlocking; and it shortens the response time.

1*c*. If AvailableImages is not empty, load this image (set Image.Locked=true and ImageLockerID=userID). Continue to Substep 2.

1*d*. If AvailableImages is empty, exit the loop and go to Step 110.

2. LoadKnowledgeBase(domain), where a domain contains a name, a key field, and a list of value fields. For example, the domain has its name Finance, a key field Account, and a list of value fields: First Name, Middle Name, Last Name, etc.

2*a*. If the knowledge base (KB) is empty, load it from the knowledge base databases.

2*b*. If KB is not empty, check if the missing rate (KB.totalMisses/KB.totalAccesses) exceeds 0.2. If not, continue to Substep 4.2.

2*c*. If substep 2*b* is true, refresh KB—RefreshKnowledgeBase:

2*c*.1) Find a list of knowledge entries in the knowledge base requires replacement, ReplacementList. In general, the least recently accessed entries should be replaced. To find this replacement list, use the following conditions: the number of replacements equals the size of MissList and KB.KBEntry.Counter=0.

2*c*.2) Load the knowledge entries based on the contents in the MissList into TempList.

2*c*.3) Replace the ReplacementList from KB with TempList, if both are not empty; otherwise continue to Step 110.

2*c*.4) If Substep 2*c*.3) succeeds, clear the MissList and reset totalAccesses and totalMisses.

2*c*.5) Continue to Step 110.

Step 110: If Step 109 succeeds, check whether the image has been digitized previously (Image.digitizedData !=empty).

Step 112: If not, attempt to load the digitized data from a backup file 130, which may have been saved during the last digitization process. This serves to prevent the loss of data due to unpredictable occurrences such as power outrage, human errors or system failure.

Step 114: If so, populate the digitized data.

Step 116: Digitize every record on the image. Each record may contain one or more fields. All records on an image can be viewed as a table. Then, each record is a row in the table and all fields in the same vertical location can be viewed as a column in the table.

1. Generate field values automatically. To the extent possible, this applies to all records to be digitized, with the exception of the first record.

1*a*. If field(s) are constant (Field.Property=Constant), populate the value of this field and values of other fields in the same column with the value of the field in the same column of a previous record, if any.

1*b*. If field(s) are sequential (Field.Property=Sequential), increment the value of this field and values of other fields in the same column, with the value of the field in the same column of previous record, if any.

1c. If field(s) are consistent (Field.Property=Consistent), populate the value of this field and the values of other fields in the same column, with common part of the value of the field in the same column of previous record, if any.

2. If field(s) are searchable (Field.Type=Searchable), search the knowledge base KB, based on a key field (Field.Type=Searchkey)—LookupKnowledgeBase.

2a. If a knowledge entry, KBEntry, can be found, populate the field(s) and increment totalAccesses and KBEntry.Counter.

2b. Otherwise, save it to MissList and increment totalMisses.

3. If none of above is true but field(s) are predictable (Field.Type=Guessable), populate the values of the field(s) with the value of the field in the same column of previous record, if any.

4. If the field depends on other fields (Field.Dependency=true), populate the value of this field based on the specified dependency rule. The rule can be defined with a pattern of "[U|C][Field Index]" and some operators, such as addition, subtraction, multiplication, and division, where U and C represent upper row or current row, respectively. For instance, an expression for a field's dependency can be defined as "U4+C1," which means that the current field can be determined by an addition of the value for the forth field of upper row and the value for the first field of current row.

5. Save the digitized record to a temporary backup file.
6. Complete digitization of each record on the image.

Step 118: Validate the digitized data.

1. Validate against predefined rules and previous digitized results. For every record, R: For every field F:

1a. Validate the value of F against the validation rule: Field.Critical and Field.DataType, Field.DataLength, and etc. If failed, mark the field as invalid.

1b. If this validation is for the double digitization, verify if the value of F is equal to the value generated in the single digitization and prompt for a confirmation.

2. If there are invalid or unconfirmed values (in double digitization), display them to user;

Step 120: If data validates, continue to Step 122.

Step 122: Submit the digitized data and save to back end database.

Step 124: If Step 122 succeeds, delete the temporarily saved backup file in Step 116 and If Step 124 succeeds, Go back to Step 109 to repeat.

When image supply exhausted, end the loop. When process completed, end digitization.

Knowledge-Based Approach

Figure 4A:
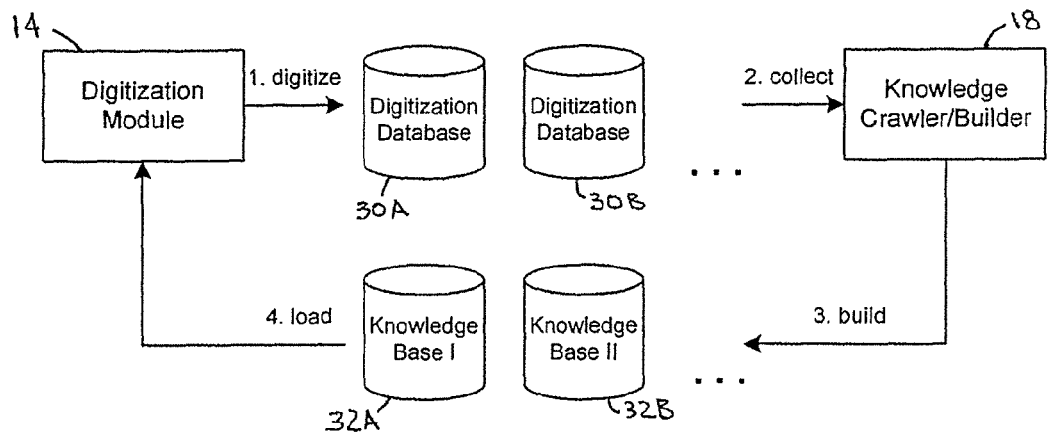
FIG. 4A presents an overview of how to build and use a knowledge base.
Figure 4B:
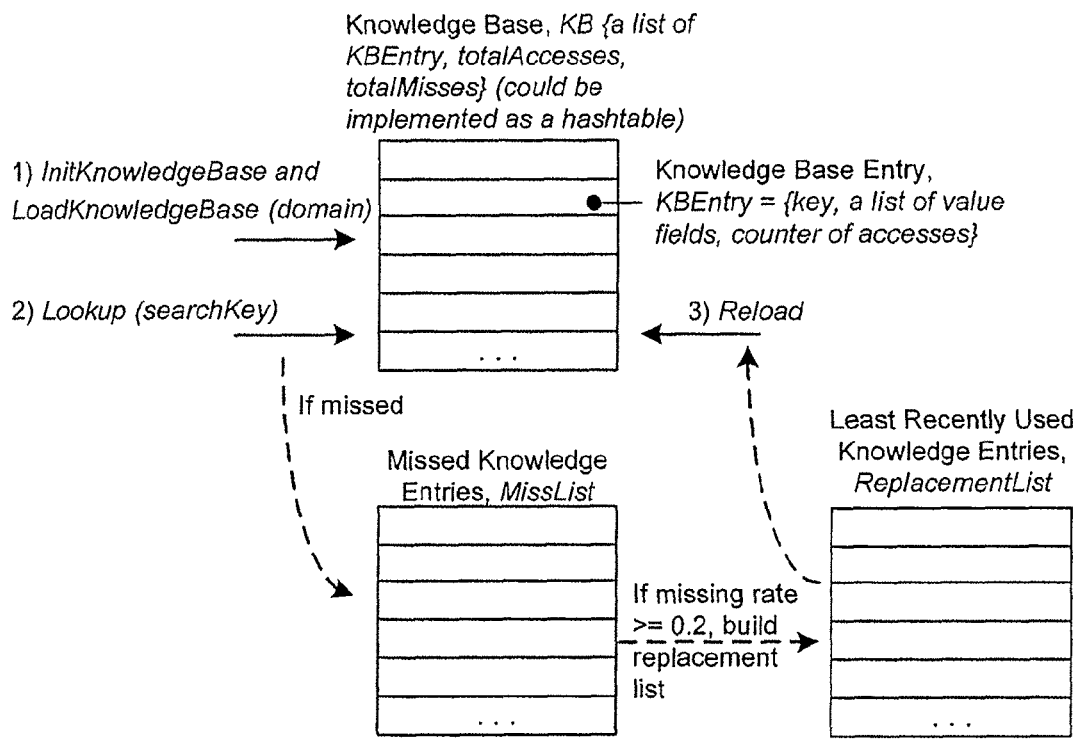
FIG. 4B presents an algorithm of how to use the knowledge base.

FIGS. 4A and 4B illustrate one form of a design and implementation of the knowledge-based approach advocated herein. FIG. 4A presents an overview of how knowledge bases 32A, 32B, etc. are constructed and used. The digitization module 14 saves the digitized data into a set of backend databases 30A, 30B, etc. Then, the knowledge crawler/builder module 18 collects the digitized data from each individual database 30A, 30B, etc. and partitions the collected data into different knowledge, in terms of separate domains. Finally, the partitioned knowledge can be loaded into the digitization module 14 to facilitate data lookups. FIG. 4B demonstrates how knowledge is used in the digitization module. As shown, several algorithms are used to initialize and load the knowledge (InitKnowledgeBase and LoadKnowledgeBase), lookup (LookupKnowledge Base), reload the knowledge (RefreshKnowledgeBase) and replace the least recently used knowledge entries with new values. The detailed descriptions of each individual algorithm have been described hereinabove.

Flexible Definitions of Image/Document Type and Fields to be Digitized

Although the system disclosed herein was initially designed for digitizing three types of documents, transaction registers, individual ledger accounts, and statement of accounts, it can be readily extended to other documents. This is because the document type and the fields to be digitized can be predefined. These definitions may be saved in an XML format. Table 1 lists the tags and their meanings.

TABLE 1

Definitions for Image Type and Fields to Be Digitized

| XML tag name | Meanings | Example | Applied at image level or field level |
|---|---|---|---|
| <type> | An image type | Transaction Register | Image Level |
| <columnCount> | Total number of fields to be digitized | 16 | Image Level |
| <rowCount> | Total number of rows/records to be digitized on the image | 50 | Image Level |
| <headerBorder> <footBorder> <leftBorder> <rightBorder> | The percentage values of the margin from the edge of the image to the body of content. All four tags are used together to define a coordinate system for displaying and moving the image | 10 10 15 15 | Image Level |
| <columnName> | The field's name | Account | Field Level |
| <columnSize> | The field's physical size | 100 pixel | Field Level |
| <columnType> | Used to define how to populate the field value. Could be Searchkey, Searchable, Guessable, and etc. | Searchable | Field Level |
| <columnProperty> | The field's property. Could be Constant, Sequential, Consistent, and etc. | Constant | Field Level |

TABLE 1-continued

Definitions for Image Type and Fields to Be Digitized

| XML tag name | Meanings | Example | Applied at image level or field level |
|---|---|---|---|
| <columnPattern> | A regular expression or string constant to define what kind of value that this field should be. Used for data validation. | YYYYMMDD | Field Level |
| <columnDataType> | Data attribute of this field: Character, number, or date. Used for data validation. | Character | Field Level |
| <columnDataSize> | Data attribute of this field: Length if the data type is character. Used for data validation. | 10 | Field Level |
| <critical> | Defines if this field is a required one. Used for data validation. | 1 | Field Level |
| <needSingleDigitization> | Define if this field needs to be digitized in single digitization process | 1 or 0 | Field Level |
| <needDoubleDigitization> | Define if this field needs to be digitized in double digitization process | 1 or 0 | Field Level |
| <needReview> | Define if this field needs to be digitized in review process | 1 or 0 | Field Level |
| <dependency> | Define how this field is depended upon other fields | U4-C1 | Field Level |

User Interface Layout

Figure 5:
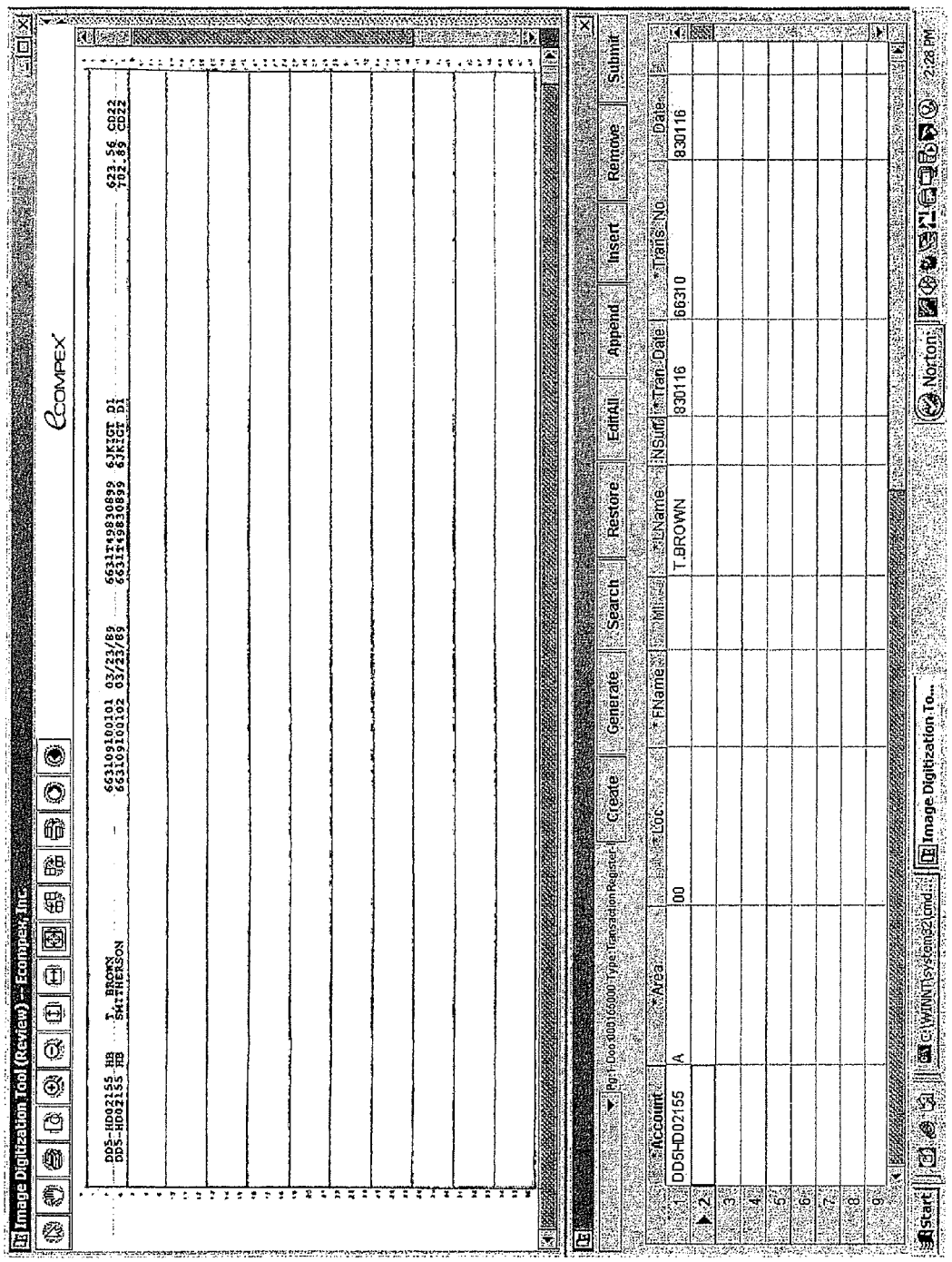
FIG. 5 presents an example of one form of a user interface layout.

It is essential that the size limitations inherent in computer screens and the look and feel of the user interface (UI) promote eye comfort for system users. These design aspects have been fully considered, as may be seen by reference to FIG. 5. As shown, an image displaying area is separated from a digitization working area. While the operator moves around in the digitization working area (through mouse, keyboard, or other computer input devices), the corresponding portion of the image can be displayed simultaneously. This advantageously enables operators to focus only on the fields that they are working on.

Delivery Module

Referring again to FIG. 2, delivery module 16 is responsible for delivering the digitized data into custom formats, such as text file, XML document, and other database files.

Knowledge Crawler/Builder Module

Still referring to FIG. 2, the knowledge crawler/builder module 18 has two major functions: 1) to collect and process the digitized data from the digitization databases 30; and 2) to partition the digitized data into separate knowledge bases 32A, 32B, etc. It can be run as a background process since it needs to process a large set of digitized data and thus this process may be very time-consuming. As shown in FIG. 4A, knowledge crawler/builder module 18 crawls several digitization databases 30A, 30B, etc. to collect the digitized data. Then, in terms of user specified rules for building different knowledge bases (not shown), it partitions the collected data into separate knowledge bases. These updated knowledge bases can in turn be used in digitization module 14 to generate lookup data.

All patents, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention, including all features which would be treated as equivalents thereof by those skilled in the art to which the invention pertains.

What is claimed is:

1. A system for digitizing a set of documents, the documents belonging to a domain, the system comprising:
    (a) an input module for providing documents in electronic form;
    (b) a digitization module for digitizing the documents provided by said input module, said digitization module including three sequential processes, a single digitization process, a double digitization process, and a review process;
    (c) an image repository and digitization database system, said image repository and digitization database system including an image repository, at least one digitization database and at least one knowledge base;
    (d) a knowledge crawler/builder module for receiving data from said digitization database and building said knowledge base; and
    (e) a delivery module for providing digitized data.

2. The system of claim 1, wherein multiple users may use the system and further comprising a locking mechanism for locking a document to a first user so that other users cannot access the document unless it has been unlocked by the first user.

3. The system of claim 1, wherein the single digitization process captures required records, the double digitization process digitizes against results of the single digitization process and the review process provides a final review and verifies that all digitized data are valid.

4. The system of claim 3, wherein the system achieves 99.99% data accuracy.

5. The system of claim 1, wherein said knowledge crawler/builder module collects and processes digitized data from said digitization database and partitions data into separate knowledge bases for use by the digitization module.

6. The system of claim 1, wherein said digitization module saves digitized data into a set of backend databases.

7. The system of claim 1, further comprising a user interface, said user interface capable of promoting eye comfort for system users.

8. The system of claim 1, wherein said delivery module provides digitized data in text files, XML documents and other database formats.

9. The system of claim 1, wherein said digitization module determines whether the document has previously been digitized and, if so, populates with data previously digitized or loads the digitized data from a backup file saved during the previous digitization process.

10. The system of claim 1, wherein the set of documents includes about 20 documents and is saved to a temporary list.

11. The system of claim 1, wherein the domain contains a name, a key field, and a list of value fields.

12. The system of claim 1, wherein said knowledge crawler/builder module runs as a background process.

13. The system of claim 1, wherein the knowledge base, includes a key field, a list of value fields and a counter indicative of how many times that an entry has been accessed.

* * * * *